(12) United States Patent
Pueschel et al.

(10) Patent No.: US 6,715,846 B1
(45) Date of Patent: Apr. 6, 2004

(54) BRAKE PRESSURE CONTROL DEVICE, ESPECIALLY FOR A ROAD VEHICLE

(75) Inventors: Helmut Pueschel, Marbach (DE); Herbert Keller, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,896

(22) PCT Filed: Dec. 15, 1998

(86) PCT No.: PCT/DE98/03681
§ 371 (c)(1),
(2), (4) Date: Sep. 12, 2000

(87) PCT Pub. No.: WO99/30944
PCT Pub. Date: Jun. 24, 1999

(30) Foreign Application Priority Data

Dec. 17, 1997 (DE) .......................................... 197 56 080

(51) Int. Cl.⁷ ............................................... B60T 8/44
(52) U.S. Cl. .................................. 303/114.3; 303/114.1
(58) Field of Search .......................... 303/113.3, 114.1, 303/114.2, 114.3, 115.3

(56) References Cited

U.S. PATENT DOCUMENTS

| | | | | |
|---|---|---|---|---|
| 3,935,709 A | * | 2/1976 | Mathues et al. ............... | 60/547 |
| 4,024,713 A | * | 5/1977 | Ueda .......................... | 60/547 |
| 4,107,926 A | * | 8/1978 | Adachi ........................ | 60/548 |
| 4,110,985 A | * | 9/1978 | Gordon et al. ................ | 60/548 |
| 4,195,484 A | * | 4/1980 | Mathues et al. ............... | 60/548 |
| 4,198,823 A | * | 4/1980 | Mathues et al. ............... | 60/547 |
| 4,199,940 A | * | 4/1980 | Mathues et al. ............... | 60/582 |
| 4,199,947 A | * | 4/1980 | Mathues et al. ............... | 60/548 |
| 4,199,948 A | * | 4/1980 | Mathues et al. ............... | 60/581 |
| 5,842,751 A | * | 12/1998 | Unterforsthuber ....... | 303/115.3 |
| 5,954,406 A | * | 9/1999 | Sawada ................... | 303/113.5 |
| 6,033,038 A | * | 3/2000 | Kulkarni et al. .......... | 303/115.3 |

FOREIGN PATENT DOCUMENTS

| | | |
|---|---|---|
| DE | 195 01 760 | 7/1996 |
| EP | 0 436 926 | 7/1991 |
| EP | 0 754 607 | 1/1997 |
| EP | 0 800 975 | 10/1997 |
| GB | 2 281 364 | 3/1995 |

* cited by examiner

Primary Examiner—Robert A. Siconolfi
(74) Attorney, Agent, or Firm—Kenyon & Kenyon

(57) ABSTRACT

Described is a braking-pressure control system, especially for a road vehicle, having a pneumatic brake booster (14), having a main cylinder (16) in which a main-cylinder pressure ($P_{HZ}$) can be generated by a pneumatic brake booster (14), and having a hydraulic modulator (17) which is connected between the main cylinder (16) and at least one wheel-brake cylinder (10–13) of at least one wheel; the hydraulic modulator (17) including a configuration of switchable valves (ASV, USV, EV, AV), as well as one pump (25, 25'); and a wheel-brake cylinder pressure ($P_{RZ}$) being able to be generated in the at least one wheel-brake cylinder (10–13), using the hydraulic modulator; the wheel-brake cylinder pressure being higher than the main-cylinder. pressure ($P_{HZ}$). The braking-pressure control system is characterized in that the pneumatic brake booster (14) is designed in a manner allowing it to already reach its saturation point ($A_0$, $A_1$) at a main-cylinder pressure ($P_{HZ}$) of less than 50 bar.

13 Claims, 5 Drawing Sheets

BRAKE PRESSURE CONTROL DEVICE, ESPECIALLY FOR A ROAD VEHICLE

FIELD OF THE INVENTION

The present invention relates to a braking-pressure control system, especially for a road vehicle.

BACKGROUND INFORMATION

British Published Patent Application No. 2 281 364 concerns a braking-pressure control system for a hydraulic dual-circuit braking system having a pneumatic power-brake unit (brake booster). A valve configuration and a return pump are provided for each brake circuit. In addition, an electronic control unit is provided, which generates signals for controlling switch-over valves (pilot valves), precharging control valves, intake and exhaust valves, as well as the return pumps; the signals are from a processing (processor) of sensor signals, which include the information on the manner of brake-pedal operation. A pneumatic brake booster includes two chambers separable from each other via a valve, one of which is operated as a low-pressure chamber and the other as a working or driving chamber and a saturation valve, with which the working chamber of the brake booster can be aerated. The apparent object of the braking-pressure control system is to ensure the highest possible values for vehicle deceleration, even in response to an automatically-controlled, full application of the brakes. In the meantime, such automatically-controlled full braking has become known under the name of "braking assistant". The braking pressure necessary for automatically applying the brakes fully is generated with the aid of the valve configuration and the return pumps, and therefore, by suitably controlling the unit subsequently designated as a hydraulic unit (hydraulic modulator).

British Patent Application No. 2 281 364 A further describes spot braking, i.e. braking during normal traffic events controlled by the driver, without the support of the hydraulic modulator (cf. page 12, lines 34–37). However, the braking force is therefore boosted only by the pneumatic brake booster in this case, which may occur in normal traffic events. This pneumatic brake booster must be correspondingly designed to reach the maximum required braking force. A disadvantage of such a pneumatic brake booster is its size, which is determined by braking pressures that must be reached. Another disadvantage is that the solenoid valves of the valve configuration, especially the pilot and the precharging control valves, must be designed for the comparably high main-cylinder pressures, which can be generated using such a pneumatic brake booster. In certain brake boosters, these pressures may be on the order of up to 250 bar.

The device for controlling an ABS-TCS system, by which it is possible to replace the vacuum brake booster completely or partially with hydraulic brake boosting. The layout of the braking system may be considered to be analogous to that of British Patent No. 2 281 364. The braking force is hydraulically boosted by selectively controlling the valve configuration and the return pumps. However, the result of completely replacing the pneumatic brake booster is, that the return pumps of the braking system must be started up in response to each braking operation, in which an increased or boosted braking pressure must be generated. This has the disadvantage of the return operation leading to pedal pulsations, which are especially annoying at low pedal forces. In addition, noises originating from operating the pump decrease the ride comfort. Although comfort may only play a subordinate role in an, emergency situation, a loss of comfort is hardly acceptable in normal vehicle operation. Also, a braking system based exclusively on hydraulic brake boosting offers less redundancy in the case of a breakdown or an error in the hydraulic modulator.

It is believed that pneumatic brake boosters used up to this point are not as well suited for an optimal design of the combined pneumatic and hydraulic braking system.

SUMMARY OF THE INVENTION

An object of an exemplary embodiment of the present invention involves combining the performance of the braking system discussed above, cylinder, with the opposing requirements for comfort (no pedal pulsations, as little disturbing noise as possible) and for taking up as little space as possible. An object of an exemplary embodiment of the present invention is to provide a braking-pressure control system that is optimized in view of these opposing requirements.

An advantage regarding the design of the braking-pressure control system is that only the pneumatic brake booster is operated in a range, in which only comparatively moderate braking pressures are needed. Upon reaching its saturation point, i.e. when the braking-pressure support cannot be further increased using the pneumatic brake booster, an additional boost in the braking pressure is generated with the aid of the hydraulic modulator. In this case, a fundamental difference from the function of the "braking assistant" is that a proportional dependence between the control pressures and the braking pressures in the wheel-brake cylinders exists (the braking pressures in the wheel-brake cylinders are largely proportional to the control pressures) over a wide operating range of the braking system, that is, for all possible brake-pedal positions, and therefore, for all possible control pressures selected by the driver of the vehicle. It is believed that this desired dependence is necessary for the driver to be able to effectively regulate the braking force quantitatively (proportion the braking force).

In this context, one must consider that the desire for proportionality of the braking force requires a rather flat characteristic curve, whereas a large boost in the braking force requires a steep characteristic curve. In this regard, different, opposing requirements must therefore also be considered in the design of the braking-pressure control system.

A particular difficulty in combining a pneumatic brake booster with a hydraulic brake booster for braking operations during normal driving events, i.e., spot braking, is to attain a defined (discrete) transition between the pneumatic and the hydraulic brake booster, which is as unnoticeable as possible to the vehicle driver. At the same time, the characteristic curve of the entire braking system should satisfy all of the existing comfort and safety requirements over all required braking pressures. Accordingly, another aspect of an exemplary embodiment of the present invention provides a braking-pressure control system of the type mentioned with an arrangement or structure for determining and evaluating the attainment of the saturation point of the pneumatic brake booster.

An advantage of the braking-pressure control system according to an exemplary embodiment of the present invention is that the pneumatic brake booster requires less space than other pneumatic, tandem, vacuum brake boosters, at least when they provide a boost similar to that of the presently described braking-pressure control system. At the same time, combining the pneumatic brake booster with a hydraulic brake booster allows even higher brake pressures to be generated in the wheel-brake cylinders. In comparison with smaller vacuum boosters, the pneumatic brake booster according to an exemplary embodiment of the present invention provides a higher boost, because its characteristic curve is designed to be steeper in the operating range, up to the saturation point.

An additional advantage of an exemplary embodiment of the present invention is that the braking system as a whole remains fully functional in response to both a vacuum breakdown and fading, since the hydraulic brake boosting can provide the entire braking-force boost in this case. The accompanying losses in comfort are acceptable, since this is certainly an exceptional case. In the same manner, the reduced performance of the pneumatic brake booster, e.g. in response to falling atmospheric pressure (driving in the mountains at an altitude of 3000 m), can be compensated for by the hydraulic brake boosting, This is also done only as needed and, as a rule, is not believed to be necessary in daily operation.

A further advantage of an exemplary embodiment of the present invention is that only comparatively low pressures can be generated in the main cylinder of the braking system (up to a maximum of 150 bar, in comparison with up to 250 bar previously), because of the small size of the pneumatic brake booster of an exemplary embodiment of the present invention. Accordingly, the solenoid valves of the hydraulic modulator must also only be designed for these correspondingly lower pressures. This reduces the outlay in designing and manufacturing the valves.

In comparison with a purely hydraulic braking system, the braking-pressure control system according to an exemplary embodiment of the present invention offers a higher level of comfort, since the return pumps must only be started up to generate braking pressure in the case of hard braking. In the typical braking-pressure range, the performance of the braking-pressure control system of an exemplary embodiment of the present invention corresponds to that of a system only having a vacuum booster, and therefore achieves a high level of pedal comfort, and can be quantitatively regulated in an effective manner. This allows the hydraulic modulator to be manufactured with reduced outlay, and therefore more cost-effectively, since its effect on the pedal comfort is no longer in the forefront.

Furthermore, further features of an exemplary embodiment of the present invention ensure that the braking force can be hydraulically supported in a selective manner. In comparison with using a conventional, small vacuum booster, the braking-pressure control system of an exemplary embodiment of the present invention also has the advantage of already providing a large braking-force boost at low braking pressures needed for spot braking.

BRIEF DESCRIPTION OF THE DRAWINGS

FIG. 1 illustrates a schematic representation of a braking-pressure control system, which is known from German Patent No. 195 01 760 A1, and from which the present invention starts out. Wheel-brake cylinders, which each belong to a wheel of a motor vehicle, are denoted by 10, 11, 12, and 13. Wheel-brake cylinders 10 and 11 belong to a first brake circuit, and wheel-brake cylinders 12 and 13 belong to a second brake circuit. Reference numeral 40 indicates a brake pedal, by which, in connection with a pneumatic brake booster 14, pressure can be generated in a known manner in a main brake cylinder 16. Main brake cylinder 16 is connected to a brake fluid reservoir 15 in a known manner. A hydraulic modulator 17 is connected between main brake cylinder 16 and wheel-brake cylinders 10 through 13, the hydraulic modulator including a valve configuration and, in this case, two return pumps 25, 25'. As is well-known, the valve configuration includes a pilot valve USV1, USV2 and a precharging or aspirator valve ASV1, ASV2 for each brake circuit, as well as an intake valve EV and an exhaust valve AV for each wheel-brake cylinder. Designations HL, HR, VL, and VR, in connection with intake and exhaust valves EV and AV, indicate the exemplary position taken on here by the respective wheel-brake cylinder on the motor vehicle. Along these lines, HL means left rear, VL means left front, HR means right rear, and VR means right front. In addition, hydraulic modulator 17 includes storage devices 30, 30', 35, and 35', which are used in a known manner to receive brake fluid. A plurality of check valves (one-way valves), such as valves 20, 20', are also provided in a known manner. German Patent No. 195 01 760 A1 describes how this hydraulic modulator 17 functions, so that a detailed explanation will not be given here. In summary, let it be said that pressure can be both built up, reduced, and held in wheel-brake cylinders 10 through 13, by suitably controlling pilot valves USV1 and USV2, intake or precharging valves ASV1 and ASV2, as well as return pumps 25 and 25'. In this case, a pressure higher than that existing in main brake cylinder 16 can be generated in wheel-brake cylinders 10 through 13, using pumps 25, 25'. Reference numeral 60 indicates a sensor, which generates information about the pedal position of brake pedal 40. Reference numeral 70 designates a sensor, by which information can be generated regarding brake pressure $P_{HZ}$ in main cylinder 16. Numerals 80 and 85 indicate sensors, by which information can be generated about the braking pressures in wheel-brake cylinders 11 and 12. For example, this information is used in different combinations to implement a "braking assistant" function or an ABS function. Furthermore, reference numeral 50 indicates a brake-light switch.

The schematic representation of the braking-pressure control system described here is known from the previously mentioned German Patent No. 195 01 760 A1. The difference of the present invention according to the main claim consists in the design of pneumatic brake booster 14, which is described using the following figures.

Figure 1:
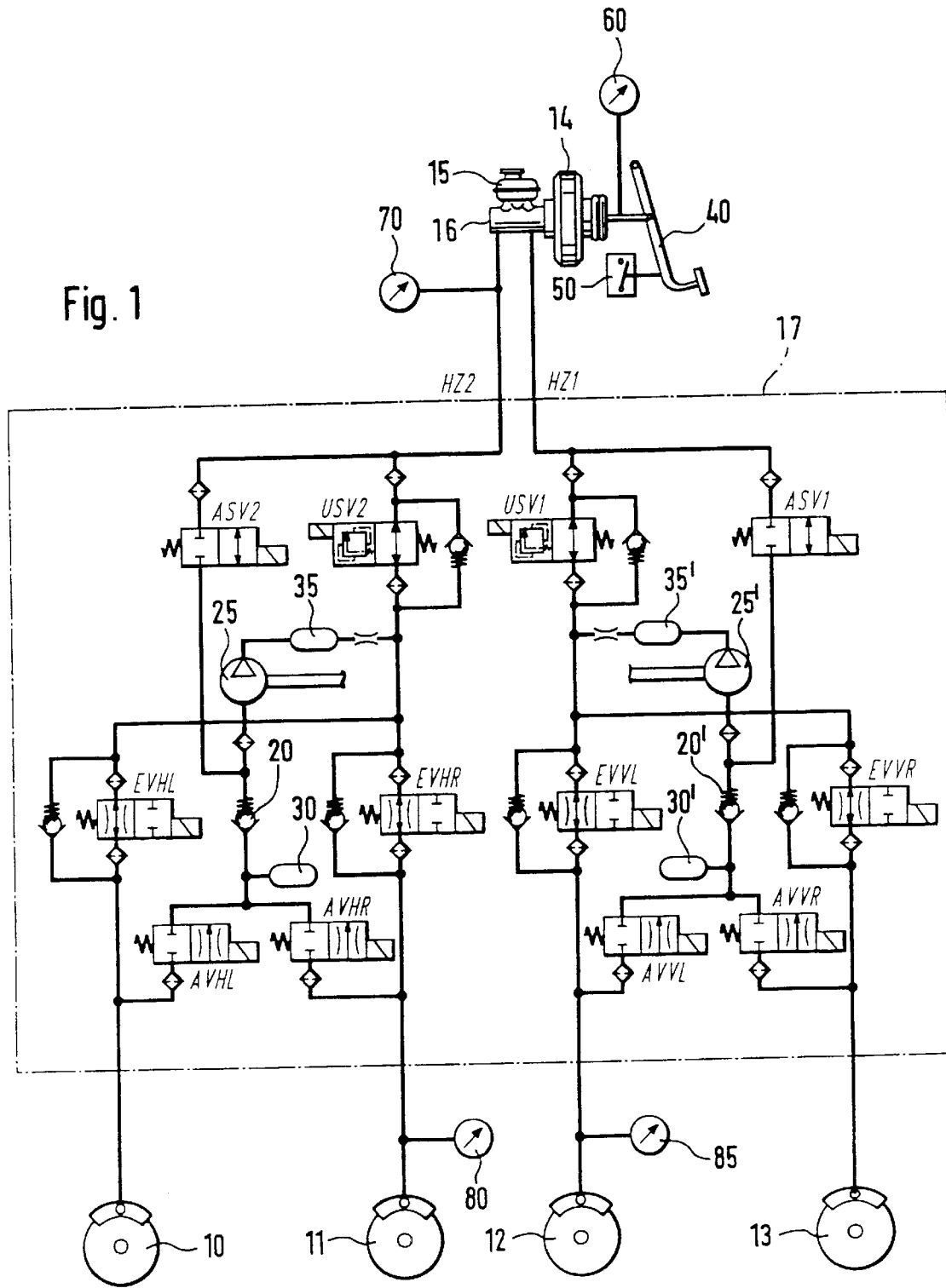
FIG. 1 shows a schematic circuit diagram of an exemplary braking system.
Figure 2:
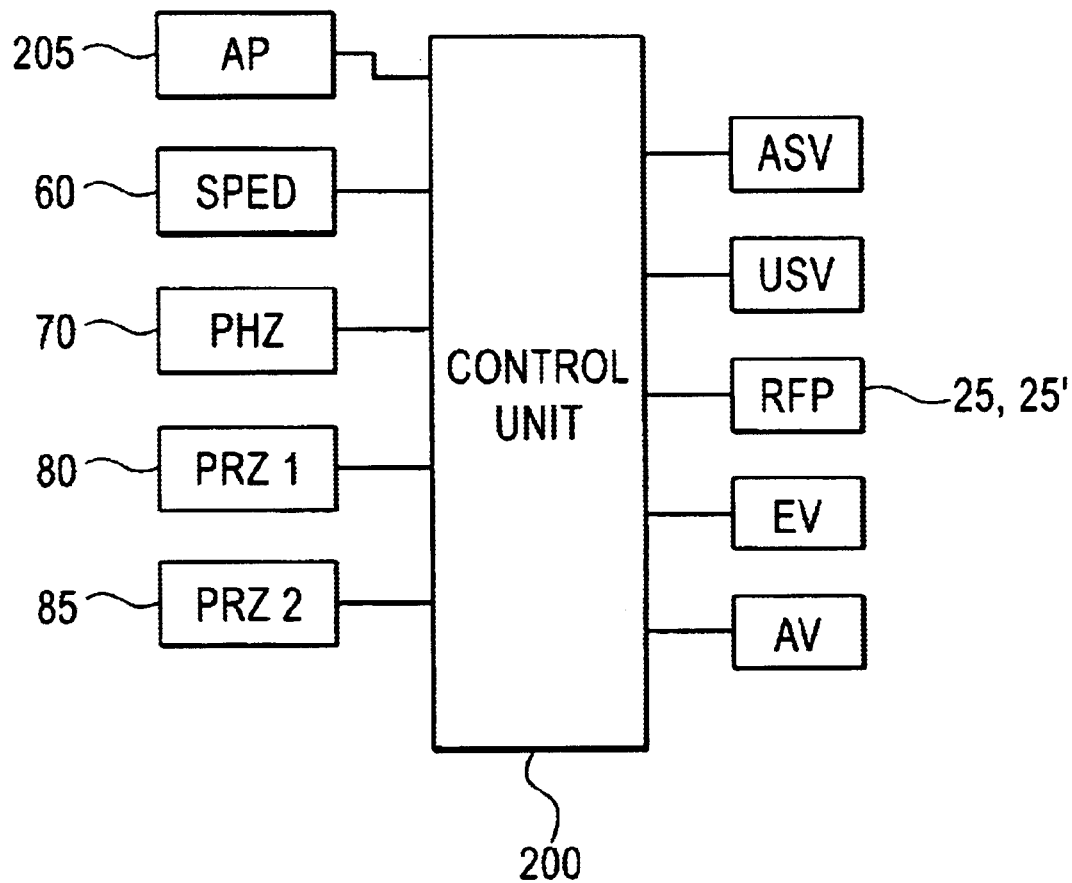
FIG. 2 shows a control arrangement or unit.

FIG. 2 shows a schematic representation of a control unit 200 for controlling the valves and return pumps 25 and 25' of hydraulic modulator 17. The signals of sensors 60, 70, 80, and 85 are fed into the incoming side of control unit 200. According to the present invention, control unit 200 also receives an identifier (signaling information) AP, which indicates that the saturation point of pneumatic brake booster 14 has been reached during a braking operation. Signaling information AP, whose generation is described below, can be, for example, a logical signal or also a flag in a register of control unit 200. Alternatively, means 205, which are described below and are for generating signal information AP, can also be stored in control unit 200, so that it is not fed signaling information AP from outside, but rather the signals needed for its purpose.

Figure 3A:
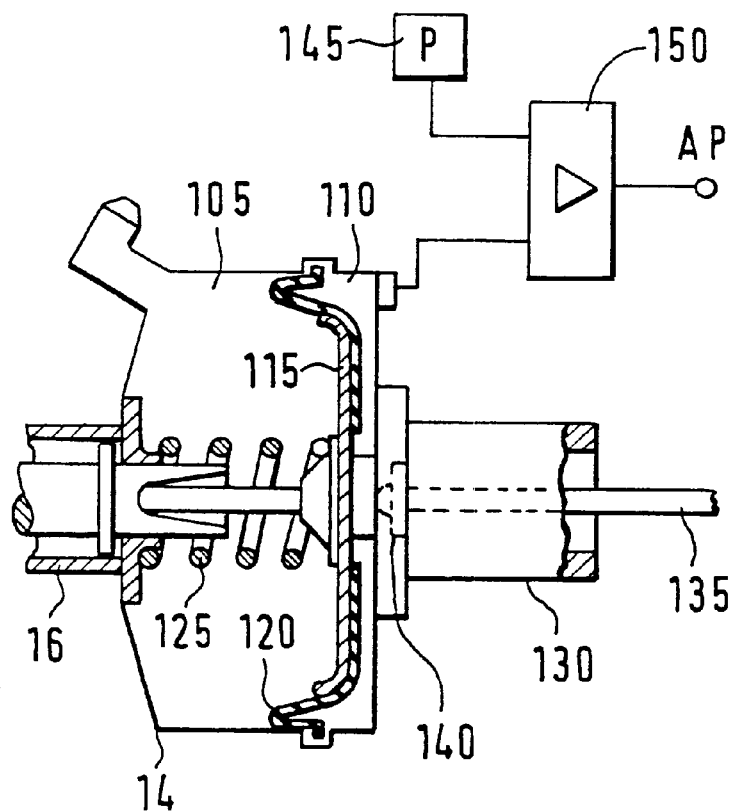
FIG. 3a shows a pneumatic brake booster having an arrangement for sensing the saturation point.

FIGS. 3a and b illustrate a pneumatic brake booster 14 known per se. It includes at least two chambers, 105 and 110, which are separated from each other by a valve not shown, chamber 105 being used in this example as a low-pressure chamber and chamber 110 being used in this example as a working chamber. The two chambers 105 and 110 are separated by a movably supported working piston 115, in connection with a roller diaphragm 120. Reference numeral 125 indicates a spring. Numeral 135 designates a piston rod, which is connected to a valve 140 inside a control housing 130. On the side of the piston rod opposite to working piston 115, piston rod 135 is connected to brake pedal 40 not shown here. Valve 140 is used in a known manner to aerate working chamber 110 of pneumatic brake booster 14.

According to a first exemplary embodiment, working chamber 110 in FIG. 3a is connected to a means 150 for determining a differential pressure. Reference numeral 145 designates a sensor for determining the ambient pressure. Means 150 determines the differential pressure (pressure difference) between the ambient pressure and the pressure in working chamber 110. Signaling information AP is generated in response to the pressure difference falling below a predefined threshold value. The appearance of signaling information AP then signalizes, that the pressure in working chamber 110 of brake booster 14 corresponds to the ambient pressure within the scope of the assumed threshold value. This signalizes that the saturation point of the brake booster has been reached.

Figure 3B:
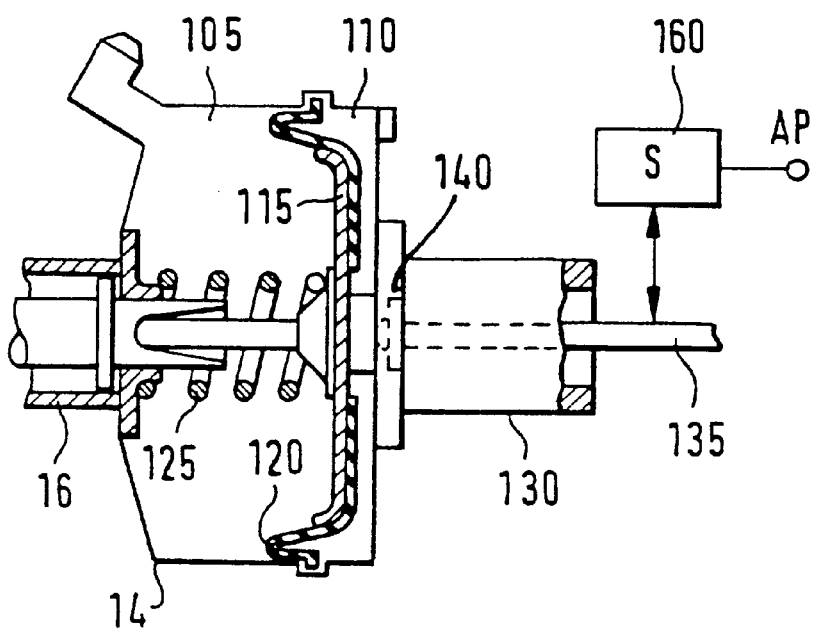
FIG. 3b shows the pneumatic brake booster having another arrangement for sensing the saturation point.

FIG. 3b shows an alternative embodiment for determining the saturation point of the brake booster, in which the path of piston rod 135 is determined using a sensor 160. Since valve 140 is opened and closed by piston rod 130, information on how far valve 140 is open, i.e. its valve lift, can be determined from the position of piston rod 135. The saturation point of brake booster 14 is then reached when valve 140 is completely open. However, apart from the preferred embodiments listed here for determining the attainment of the saturation point, alternative specific embodiments can also be used within the framework of the present invention.

Figure 4:
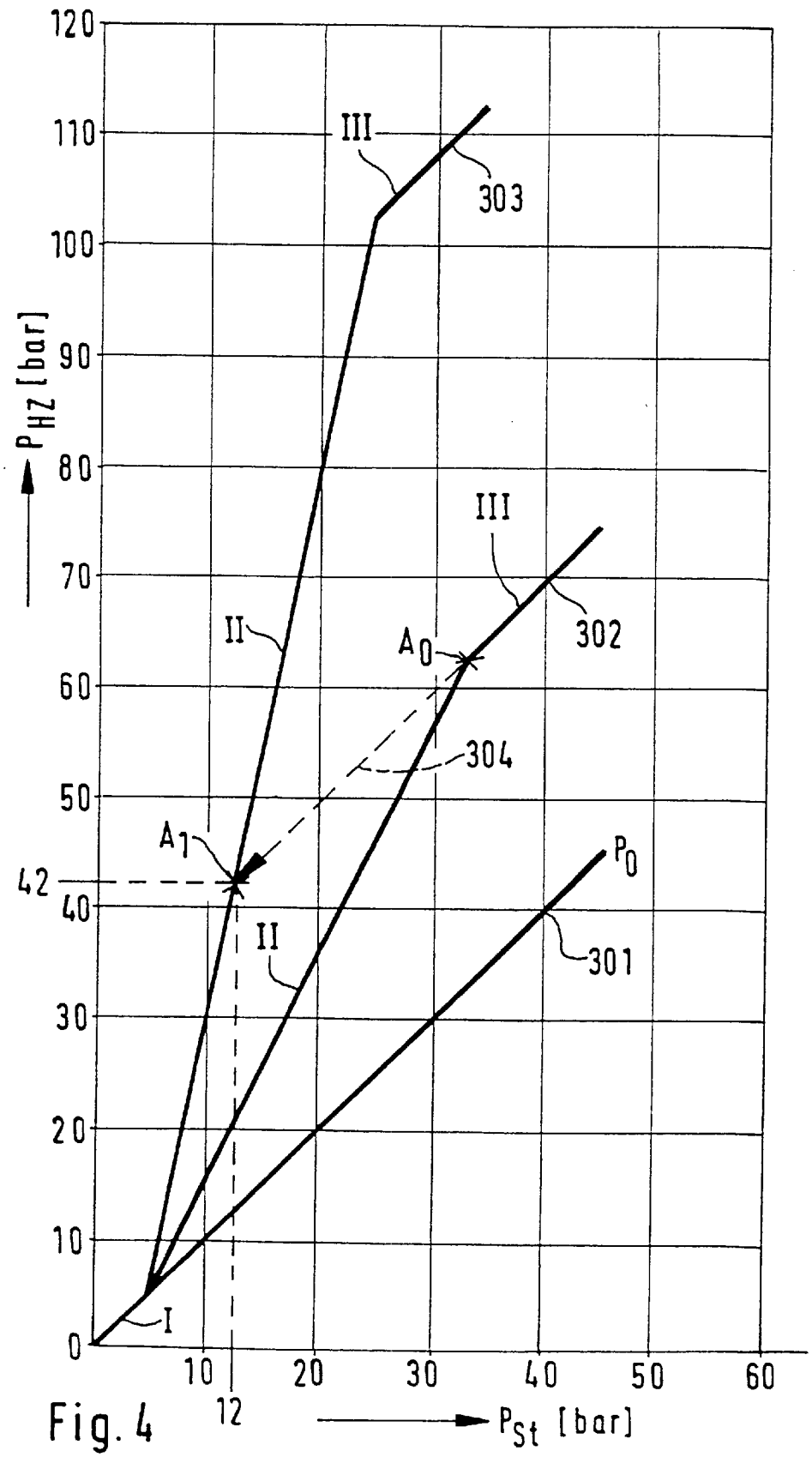
FIG. 4 shows characteristic curves of various pneumatic brake boosters.

Using three characteristic curves, FIG. 4 indicates how brake booster 14 of the present invention is accordingly designed. A control pressure $P_{St}$ generated by operating brake pedal 40 is plotted along the abscissa. The pressure in main cylinder 16 of the braking-pressure control system is plotted along the ordinate. Characteristic curve 301 indicates conditions in which no boost whatsoever is received from a brake booster 14. Accordingly, control pressure $P_{St}$ is identical to the main-cylinder pressure $P_{HZ}$ over the entire range of the characteristic curve. In contrast, characteristic curves 302 and 303 indicate conditions, as they occur with a functioning brake booster 14. Characteristic curve 302 shows braking pressure $P_{HZ}$ in the main cylinder in response to using a simple, small vacuum booster. Characteristic curve 303 shows the conditions in response to using a larger, tandem vacuum booster. The latter two characteristic curves can each be subdivided into three characteristic curve segments I, II, and III. In first characteristic curve segment I common to both characteristic curves, the braking force is not yet being pneumatically boosted. In this characteristic curve segment I, characteristic curves 302 and 303 correspond to previously mentioned characteristic curve 301. A characteristic curve segment II begins from a certain threshold, at which control pressure $P_{St}$ is, for the first time, so large, that braking-pressure control valve 140 is opened; the slope of characteristic curve segment II being increased in comparison with characteristic curve 301. This means that a higher main-cylinder pressure $P_{HZ}$ is generated at the same control pressure $P_{St}$. In this case, a larger slope in characteristic curve segment II signifies a larger boosting effect of brake booster 14. As can be seen, a tandem vacuum booster according to characteristic curve 303 has a larger boost than a simpler, smaller vacuum booster according to characteristic curve 302. The boost of brake booster 14 according to characteristic curve 302 or 303 increases until the pressure in working chamber 110 has reached its maximum value. From this point on, increasing the control pressure $P_{St}$ further only results in a linear increase of main-cylinder pressure $P_{HZ}$. This point, at which characteristic curves 302 and 303 pass over from characteristic curve segment II into characteristic curve segment III, is designated as the saturation point. The slope of characteristic curves 302 and 303 in characteristic curve segments III is identical to the slope of characteristic curve 301.

Characteristic curve 302 indicates a typical characteristic curve, and therefore, a typical design of a simple vacuum booster used today. In this case, the possible boost of the booster is predetermined by its size. Two opposing requirements must now be brought into accord for designing the booster with a given size. On one hand, the boost of the booster should be as large as possible, meaning that characteristic curve segment II should have as large a slope as possible. However, this is counteracted by the opposite requirement, that characteristic curve range II should cover as large an interval of control pressure $P_{St}$ as possible. This requirement, which leads to the lay-out of characteristic curve range II being as flat as possible, follows from the desire that the braking force be easy to quantitatively regulate over as wide a range of control pressure $P_{St}$ as possible, and therefore, in as wide a range of brake-pedal operation as possible. As can be seen from characteristic curve 303, it is only possible to improve both opposing requirements by enlarging brake booster 14. As mentioned previously, simple vacuum boosters of today are usually designed according to characteristic curve 302.

In order to combine a pneumatic brake booster 14 with hydraulic brake boosting using a hydraulic modulator 17, the present invention now proposes shifting the saturation point $A_0$ of a pneumatic brake booster 14, which is designed as a simple vacuum booster, to considerably lower main-cylinder pressures and control pressures. This is indicated in FIG. 4 by dashed line 304 and by saturation point $A_1$ drawn in. In practice, this means that brake booster 14 according to the present invention is designed with an unchanged size, in such a manner, that the slope of characteristic curve segment II, and therefore its boost at low control pressures $P_{St}$, corresponds to the boost of a considerably larger, tandem, vacuum brake booster. At the conditions exemplarily represented here, this means that a boost in braking force greater than that given by a simple vacuum booster of its size occurs up to a control pressure $P_{St}$ of approximately 12 bar and thus, a main-cylinder pressure $P_{HZ}$ of approximately 42 bar. However, if a braking pressure of, e.g., 100 bar in the wheelbrake cylinder is needed by a vehicle in a certain braking situation, the additional boost above the saturation point $A_1$ dimensioned according to the present invention is provided with the aid of hydraulic modulator 17. In so doing, the hydraulic boosting is designed in such an advantageous manner, that the total boost above saturation point $A_1$ corresponds to the boost of the larger tandem-vacuum booster, or is even larger.

Figure 5:
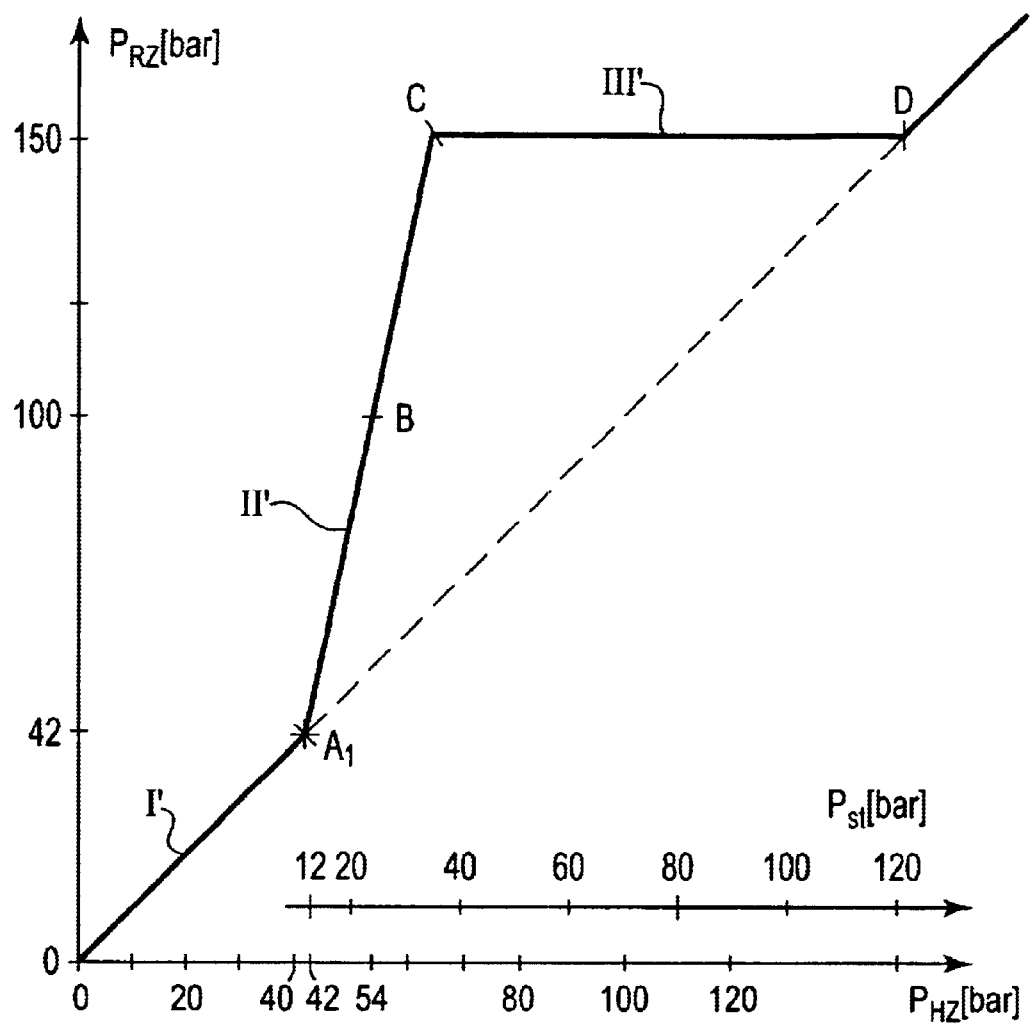
FIG. 5 shows an exemplary characteristic curve of a braking-pressure control system according to an exemplary embodiment of the present invention.

FIG. 5 illustrates an example of an entire characteristic curve of a braking-pressure control system according to the present invention. Main-cylinder brake pressure $P_{HZ}$ is plotted in bar along the abscissa. A linearly shifted scale for the control pressure $P_{St}$, which is drawn approximately to scale, is parallel to the main-cylinder brake-pressure scale. The pressure in wheel-brake cylinder PRZ is likewise plotted in bar along the ordinate. The simple vacuum booster, which is designed according to the present invention and has saturation point $A_1$, boosts the braking force by itself in first characteristic curve range I', up to a main-cylinder pressure of 42 bar. The braking force is not boosted hydraulically in this range, so that pressure $P_{HZ}$ in the main cylinder corresponds to pressure $P_{RZ}$ in the wheel-brake cylinder. However, in comparison with control pressure $P_{St}$, pressure $P_{RZ}$ in the wheel-brake cylinder is increased in accordance with characteristic curve segment II of characteristic curve 302, based on saturation point $A_1$. As of reaching saturation point $A_1$, which occurs at a main-cylinder pressure $P_{HZ}$ of 42 bar, as shown in the present example, the braking force is hydraulically boosted using hydraulic modulator 17. This is associated with losses in comfort due to pumps 25 and 25' starting up; however, this is tolerable considering that the saturation point is only exceeded during hard braking. According to the exemplary embodiment represented here, the hydraulic boosting of the braking force ends at a pressure $P_{RZ}$ of 150 bar in the wheel-brake cylinder. This is shown by characteristic curve segment III', in which pressure $P_{RZ}$ remains constant, even when main-cylinder pressure $P_{HZ}$ or control pressure $P_{St}$ is increased. Pressure $P_{RZ}$ in the wheel-brake cylinder only increases further at a control pressure above 120 bar, but this increase is not from boosting, and directly corresponds to the increase of control pressure $P_{St}$. However, this point, which is labeled D in the characteristic curve of FIG. 5, is surely not reached in reality, since correspondingly high forces would be necessary for operating brake pedal 40. The attainment of saturation point $A_1$ and therefore, the commencement of the hydraulic brake boosting in characteristic curve segment II', are advantageously detected by a suitable sensor (group), as shown by way of example in FIGS. 3a and 3b.

A further refinement of the present invention consists in relating the appearance of the AP signaling information, i.e. the attainment of saturation point $A_1$ of vacuum brake booster 14, to pressure $P_{HZ}$ existing simultaneously in main cylinder 16. Current pressure $P_{HZ}$ in main cylinder 16 can be easily determined by sensor 70. When a braking-pressure control system is functioning correctly and atmospheric conditions are normal, main-cylinder pressure $P_{HZ}$ would have to have at least an approximately equal value. Conversely, it can be inferred from this that a fault condition, or at least a condition deviating from normal operation, then exists when the main-cylinder pressure has a value deviating from this known value in response to reaching saturation point $A_1$. For example, this situation can occur when the boost of the vacuum booster is smaller than usual, due to the atmospheric pressure being very low as a result of driving in the mountains. In the same way, this situation can occur when there is an error in the braking system.

If upon reaching saturation point $A_1$, main-cylinder pressure $P_{HZ}$ now deviates from the expected value by more than a set threshold value, the hydraulic brake boosting is advantageously adjusted from the newly determinable deviation, in such a manner, that the braking pressure in the wheel-brake cylinder nevertheless reaches the desired or needed value.

Figure 6:
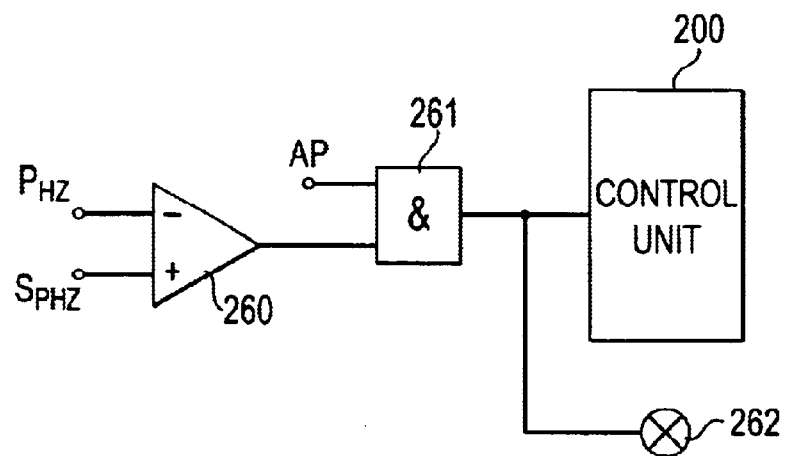
FIG. 6 shows an arrangement for detecting an error condition.

For example, a set-up according to FIG. 6 can be used to detect such an error condition. This figure shows a comparator designated by 260, at whose inputs currently measured main-cylinder pressure $P_{HZ}$ is located on one hand, and a comparison value $S_{PHZ}$ assigned to the attainment of saturation point $A_1$ is located on the other hand. The comparator is connected here in such a manner, that it generates a logical high signal when currently measured main-cylinder pressure $P_{HZ}$ is below comparison value $S_{PHZ}$. The output signal of the comparator is supplied to an input of a logical AND-gate 261. Signaling information AP is located at the second input of the AND-gate. The AND-gate accordingly generates a logical high signal at its output, when on one hand, signaling information AP is present, and on the other hand, current main-cylinder pressure $P_{HZ}$ is lower than comparison value $S_{PHZ}$. The output signal of AND-gate 261 is preferably fed to both control unit 200 and a warning or display means 262. The latter allows the detected deviation from the normal condition to be displayed for the driver of the motor vehicle.

Using this further refinement ensures that the required braking pressure in the wheel-brake cylinder can always be attained independently of the elevation, since the deviations due to the different atmospheric pressure are compensated for with the aid of the hydraulic brake boosting.

The invention comprises a braking-pressure control system for a road vehicle, the system comprising: a main cylinder 16; a pneumatic brake booster 14 having a first saturation point ($A_0$, $A_1$) and a second saturation point ($A_1$, $A_0$), the pneumatic brake booster 14 including at least two chambers (105, 110) separable from each other, at least one of the at least two chambers (105, 110) being operable as a low-pressure chamber (105, 110) and at least one other of the at least two chambers (105, 110) being a working chamber (110, 105), wherein the pneumatic brake booster 14 can generate a main-cyclinder pressure in the main cylinder 16 according to a specifiable control pressure; and a hydraulic modulator 17 connected between the main cylinder 16 and at least one wheel-brake cylinder (10, 11, 12, 13) of at least one wheel of the road vehicle, the hydraulic modulator 17 including an arrangement of switchable valves and at least one pump, wherein: the hydraulic modulator 17 can generate a wheel-brake cylinder pressure in the at least one wheel-brake cylinder (10, 11, 12, 13) that is higher than the main-cylinder pressure, the hydraulic modulator 17 starts to generate an increased wheel-brake cylinder pressure at the first saturation point ($A_0$, $A_1$), the main-cylinder pressure and the specifiable control pressure being in at least one of a fixed proportion and a predetermined proportion to each other up to the first saturation point ($A_0$, $A_1$); and the hydraulic modulator 17 starts to generate another increased wheel-brake cylinder pressure at the second saturation point ($A_1$, $A_0$) at main-cylinder pressures that are lower than main-cylinder pressures associated with the first saturation point ($A_0$, $A_1$); wherein: a proportion of the main-cylinder pressure to the specifiable control pressure increases; and the pneumatic brake booster reaches the second saturation point ($A_1$, $A_0$) when the main-cylinder pressure is greater than about 0 bar and less than about 50 bar. And, wherein the pneumatic brake booster 14 reaches at least one of the first saturation point ($A_0$, $A_1$) and the second saturation point ($A_1$, $A_0$) when the main-cylinder pressure is approximately 40 bar to 45 bar.

The invention further comprises a signaling information arrangement for generating signaling information for indicating that at least one of the first saturation point ($A_0$, $A_1$) and the second saturation point ($A_1$, $A_0$) has been reached during a braking operation. And, wherein the signaling arrangement determines a pressure difference between the working chamber (105, 110) and an external ambient pressure, and generates the signaling information when the pressure difference falls below a threshold value. The braking-pressure control system of this invention further comprises wherein when the signaling arrangement detects an opening state of a pressure-regulating valve, it generates the signaling information when the opening state exceeds a threshold value.

The invention also includes a control arrangement for controlling the arrangement of switchable valves, wherein the signaling information is fed to the control arrangement for controlling the arrangement of switchable valves, and wherein the control arrangement controls the arrangement of switchable valves when the signaling information is present so that the wheel-brake cylinder pressure is increased in comparison with the main-cylinder pressure.

The invention further comprising; a current pressure determining arrangement for determining a current pressure in the main cylinder 16; and a determining arrangement for determining whether the current pressure in the main cylinder 16 approximately corresponds to an expected comparison value when the signaling information is present, and, further comprising a signal arrangement for generating a signal when the current pressure in the main cylinder 16 is smaller than the expected comparison value when the signaling information is present, and including a control arrangement for controlling the arrangement of switchable valves; and an output signal arrangement for feeding an output signal to the control arrangement.

What is claimed is:

1. A braking pressure control device for a vehicle, comprising:
    a pneumatic brake booster, which includes at least two chambers, which are separable from each other, and from which at least one is operable as a low-pressure chamber and at least one other is operable as a working chamber;
    a main cylinder, in which a main-cylinder pressure is generatable by the pneumatic brake booster in accordance with a specifiable control pressure;
    a hydraulic unit, which is inserted between the main cylinder and at least one wheel-brake cylinder of at least one wheel, the hydraulic unit including an array of switchable valves and at least one pump;
    wherein:
        a wheel-brake cylinder pressure higher than the main-cylinder pressure is generatable in the at least one wheel-brake cylinder with the hydraulic unit,
        the pneumatic brake booster has a first control point, and
        a first ratio of the main-cylinder pressure to the control pressure is predefined up to the first control point;
    wherein in the pneumatic brake booster:
        a second ratio of the main-cylinder pressure to the control pressure is preselected,
        a greater pneumatic brake boost of the main-cylinder pressure by the control pressure is achievable with the second ratio than would otherwise be achievable with the first ratio,
        the maximum achievable brake boost of the pneumatic brake booster, using the second ratio, is attained at a second control point,
        the second control point is attained at a main-cylinder pressure of greater than 0 and less than 50 bar, and
        a generation of an increased wheel-brake cylinder pressure, using a hydraulic brake boost by the hydraulic unit, sets in at the second control point.

2. The braking-pressure control device of claim 1, wherein the second control point is attained at a lower main-cylinder pressure than for the first control point.

3. The braking-pressure control device of claim 1, an increase in the wheel-brake cylinder pressure by the hydraulic unit up to a maximum possible control point is increased as a function of a variable representing the control pressure.

4. The braking-pressure control device of claim 3, wherein the maximum possible control point represents a maximum feed limit of the at least one pump of the hydraulic unit.

5. The braking-pressure control device of claim 1, wherein the pneumatic brake booster reaches at least one of the control points when the main-cylinder pressure is approximately 40 to 45 bar.

6. The braking-pressure control device of claim 1, further comprising: an arrangement to generate an identifier to indicate when one of the first control point and the second control point of the pneumatic brake booster is reached during a braking action.

7. The braking-pressure control device of claim 6, wherein the arrangement is operable to determine a differential pressure between the working chamber of the pneumatic brake booster and an external ambient pressure, and to generate the identifier in response to a threshold value being undershot.

8. The braking-pressure control device of claim 6, wherein the arrangement is operable to detect an opening state of a pressure-regulating valve of the pneumatic brake booster, and to generate the identifier in response to a threshold value being exceeded.

9. The braking-pressure control device of claim 6, wherein the identifier is supplied to a control unit to control the array of switchable valves.

10. The braking-pressure control device of claim 9, wherein, in a presence of the identifier, the control unit controls the array of switchable valves so that the wheel-brake cylinder pressure is increased with respect to the main-cylinder pressure.

11. The braking-pressure control device of claim 6, further comprising: a current main-cylinder pressure determining arrangement to determine a current main-cylinder pressure in the main cylinder, and a checking arrangement to check if, in a presence of the identifier, the current pressure in the main cylinder approximately corresponds to a comparison value to be expected.

12. The braking-pressure control device of claim 11, further comprising: a signaling arrangement to generate a signal, when, in the presence of the identifier, the current main-cylinder pressure in the main cylinder is less than the comparison value to be expected.

13. The braking-pressure control device of claim 11, wherein an output signal is supplied to the checking arrangement of the control unit.

* * * * *

UNITED STATES PATENT AND TRADEMARK OFFICE
CERTIFICATE OF CORRECTION

PATENT NO. : 6,715,846 B1
DATED : April 6, 2004
INVENTOR(S) : Helmut Pueschel et al.

It is certified that error appears in the above-identified patent and that said Letters Patent is hereby corrected as shown below:

Title page,
Item [57], ABSTRACT,
Line 1, change "Described is a" to -- A --
Line 2, change "brake booster (14)", to -- brake booster, --
Line 3, change "a main cylinder (16)" to -- main cylinder --
Line 4, change "pressure (PH2) to -- pressure --
Line 5, change "booster (14)" to -- booster, --
Lines 5-6, change "a hydraulic modulator (17), which is connected" to -- a hydraulic modulator connected --
Line 6, change "main cylinder (16)" to -- main cylinder --
Line 7, change "cylinder (10-13) of at least one wheel; the" to -- cylinder of at least one wheel. The --
Line 8, change "modulator (170 including" to -- modulator includes --
Line 9, change "valves (ASV, USV, EV, AV) as well as one pump (25), to -- values and one pump, --
Lines 10-11, change "pressure ($P_{RZ}$) being able to be generated" to -- pressure is generated --
Lines 11-12, change "Cylinder (10-13), suing the hydraulic modulator; the" to -- cylinder, using the hydraulic modulator. The --
Line 13, change "pressure being higher" to -- pressure is higher --
Line 14, change "system is characterized on that" to -- system, --
Lines 15-16, change "booster (14) is designed in a manner allowing it to already reach its" to -- booster reaches its --
Lines 16-17, change "point ($A_O$, $A_1$) ... pressure ($P_{H2}$) of" to -- point...pressure of --

Column 1,
Line 19, change "return pumps; the signal" to -- return pumps. The signal --
Line 54, change "The device..." to -- German Patent No. 195 01 760 Al describes the method and the device in an emergency --

Column 2,
Line 2, change "in an, emergency" to -- in an emergency --
Line 14, change "discussed above, cylinder, with the" to -- discussed above with the --

Column 6,
Line 48, change "invention now proposes" to -- invention involves --
Lines 53-54, change "according to the present invention" to -- according to an exemplary embodiment of the present invention --
Line 66, change "according to the present invention" to -- according to an exemplary embodiment of the present invention --

UNITED STATES PATENT AND TRADEMARK OFFICE
CERTIFICATE OF CORRECTION

PATENT NO. : 6,715,846 B1
DATED : April 6, 2004
INVENTOR(S) : Helmut Pueschel et al.

It is certified that error appears in the above-identified patent and that said Letters Patent is hereby corrected as shown below:

Column 7,
Lines 6-7, change "according to the present invention" to -- according to an exemplary embodiment of the present invention --
Line 13, change "according to the present invention" to -- according to an exemplary embodiment of the present invention --
Line 46, change "A further refinement of the present invention" to -- A further feature of --

Column 8,
Line 7, change "is located on one hand," to -- is located --
Line 9, change "is located on the other hand." to -- is located. --
Line 16, change "when on one hand, signaling" to -- when signaling --
Line 17, change "on the other hand current" to -- current --
Line 20, change "display means 262." to -- display arrangement or structure --

Column 8, line 28 to Column 9, line 34,
Delete "The invention comprises...to the control arrangement."

Signed and Sealed this

Fifth Day of July, 2005

JON W. DUDAS
*Director of the United States Patent and Trademark Office*